United States Patent
Chandran

(10) Patent No.: US 11,452,113 B2
(45) Date of Patent: Sep. 20, 2022

(54) METHOD AND BASE STATION FOR CSG AWARE SCHEDULING IN WIRELESS NETWORK

(71) Applicant: SAMSUNG ELECTRONICS CO., LTD., Gyeonggi-do (KR)

(72) Inventor: Ramesh Chandran, Bangalore (IN)

(73) Assignee: Samsung Electronics Co., Ltd

( * ) Notice: Subject to any disclaimer, the term of this patent is extended or adjusted under 35 U.S.C. 154(b) by 129 days.

(21) Appl. No.: 17/044,081

(22) PCT Filed: Jul. 24, 2019

(86) PCT No.: PCT/KR2019/009155
§ 371 (c)(1),
(2) Date: Sep. 30, 2020

(87) PCT Pub. No.: WO2020/022767
PCT Pub. Date: Jan. 30, 2020

(65) Prior Publication Data
US 2021/0058939 A1 Feb. 25, 2021

(30) Foreign Application Priority Data

Jul. 24, 2018 (IN) ........................ 201841027786 PS
Jul. 15, 2019 (IN) ........................ 201841027786 CS

(51) Int. Cl.
*H04W 72/10* (2009.01)
*H04W 48/02* (2009.01)
(Continued)

(52) U.S. Cl.
CPC ........... *H04W 72/10* (2013.01); *H04W 48/02* (2013.01); *H04W 72/042* (2013.01);
(Continued)

(58) Field of Classification Search
CPC ... H04W 72/10; H04W 48/02; H04W 72/042; H04W 72/087; H04W 72/1231; H04W 76/12
See application file for complete search history.

(56) References Cited

U.S. PATENT DOCUMENTS 8,599,701 B2  12/2013 Horn et al.
8,774,801 B2  7/2014 Ore et al.
(Continued)

FOREIGN PATENT DOCUMENTS

CN  101730315  6/2010
CN  102197669  9/2011
(Continued)

OTHER PUBLICATIONS

Indian Examination Report dated Jul. 1, 2021 issued in counterpart application No. 201841027786, 5 pages.
(Continued)

*Primary Examiner* — Shailendra Kumar
(74) *Attorney, Agent, or Firm* — The Farrell Law Firm, P.C.

(57) ABSTRACT

This disclosure provides a method for CSG aware scheduling in a wireless network. The method includes determining, by a base station, a priority for each of CSG users and N-CSG users in a time domain based on a plurality of parameters. Further, the method includes changing, by the base station, the priority for each of the CSG users and the N-CSG users using a weight value. Further, the method includes allocating, by the base station, RBs to the CSG users and the N-CSG users based on the changed priority for each of the CSG users and the N-CSG users.

18 Claims, 4 Drawing Sheets

(51) Int. Cl.
*H04W 72/04* (2009.01)
*H04W 72/08* (2009.01)
*H04W 72/12* (2009.01)
*H04W 76/12* (2018.01)

(52) U.S. Cl.
CPC ..... *H04W 72/087* (2013.01); *H04W 72/1231* (2013.01); *H04W 76/12* (2018.02)

(56) References Cited

U.S. PATENT DOCUMENTS

| | | | |
|---|---|---|---|
| 9,338,811 | B2 | 5/2016 | Schmidt et al. |
| 9,826,541 | B1 | 11/2017 | Gitlin et al. |
| 2003/0013451 | A1* | 1/2003 | Walton ................. H04W 16/04 455/512 |
| 2009/0207769 | A1 | 8/2009 | Park et al. |
| 2009/0305699 | A1 | 12/2009 | Deshpande et al. |
| 2010/0120459 | A1* | 5/2010 | Delaval ............. H04W 72/1252 455/509 |
| 2011/0069660 | A1* | 3/2011 | Lin ....................... H04W 72/10 370/328 |
| 2011/0098052 | A1 | 4/2011 | Jung et al. |
| 2011/0105123 | A1 | 5/2011 | Lee et al. |
| 2011/0218004 | A1 | 9/2011 | Catovic et al. |
| 2014/0073342 | A1* | 3/2014 | Lioulis ................ H04W 72/082 455/452.2 |
| 2015/0063099 | A1 | 3/2015 | Sadek |
| 2015/0063148 | A1* | 3/2015 | Sadek ................. H04W 52/243 370/252 |
| 2016/0205631 | A1* | 7/2016 | Chen ................... H04W 52/346 455/522 |
| 2016/0205640 | A1 | 7/2016 | Dinan |
| 2017/0111926 | A1* | 4/2017 | Madan .............. H04W 72/1273 |
| 2019/0116592 | A1* | 4/2019 | Moon .................. H04L 5/0092 |

FOREIGN PATENT DOCUMENTS

| | | |
|---|---|---|
| CN | 102378307 | 3/2012 |
| DE | 102016106623 | 10/2017 |
| KR | 1020110049676 | 5/2011 |
| KR | 101264360 | 5/2013 |
| KR | 10-1866109 | 6/2018 |
| KR | 10-1870200 | 6/2018 |

OTHER PUBLICATIONS

PCT/ISA/210 Search Report issued on PCT/KR2019/009155, dated Oct. 29, 2019, pp. 4.
PCT/ISA/237 Written Opinion issued on PCT/KR2019/009155, dated Oct. 29, 2019, pp. 6.
ZTE, China Mobile, "Impact on Established Communications because of Changes of the CSG Membership Status at Hybrid Mode H(e)NB", S2-093221, XP050346313, 3GPP TSG SA WG2 Meeting #73, May 11-15, 2009, 3 pages.
European Search Report dated Feb. 8, 2021 issued in counterpart application No. 19842333.7-1215, 13 pages.

* cited by examiner

[Fig. 1]
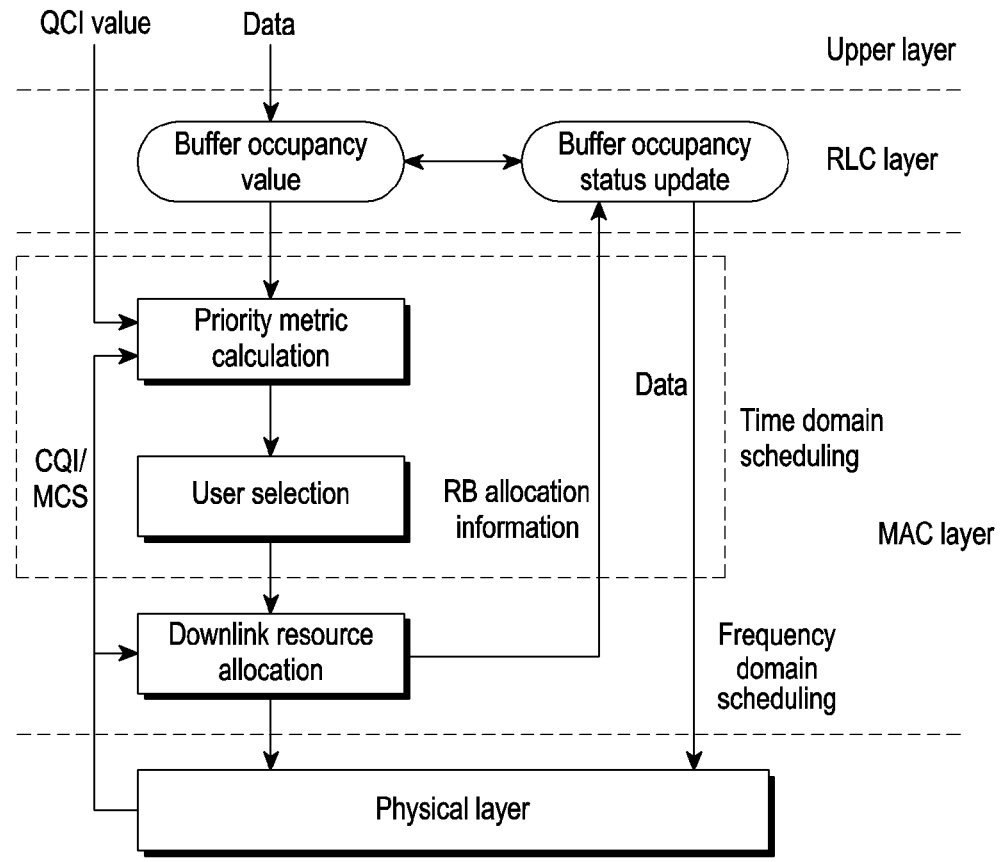
[Fig. 2A]
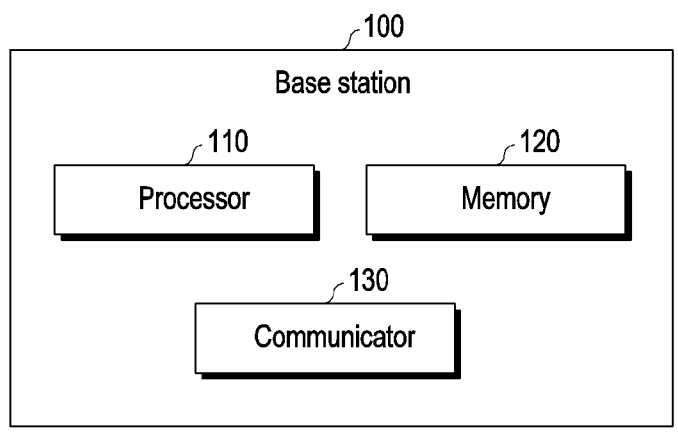

[Fig. 2B]
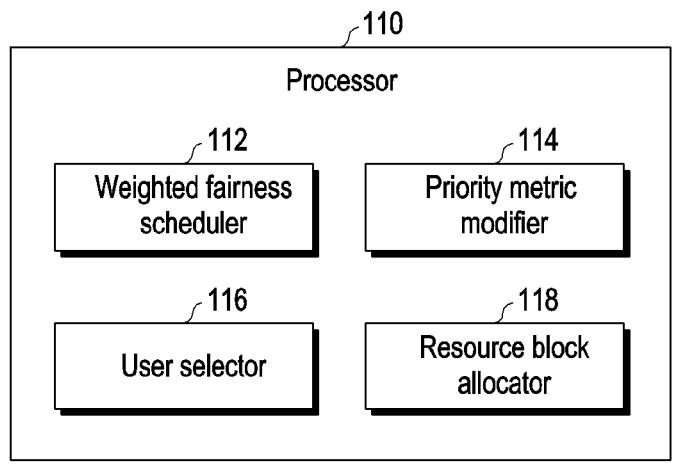
[Fig. 3A]
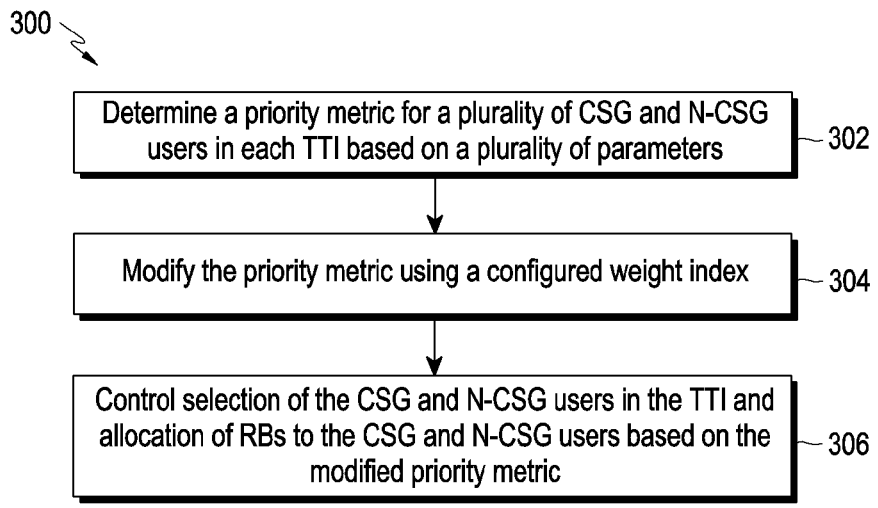

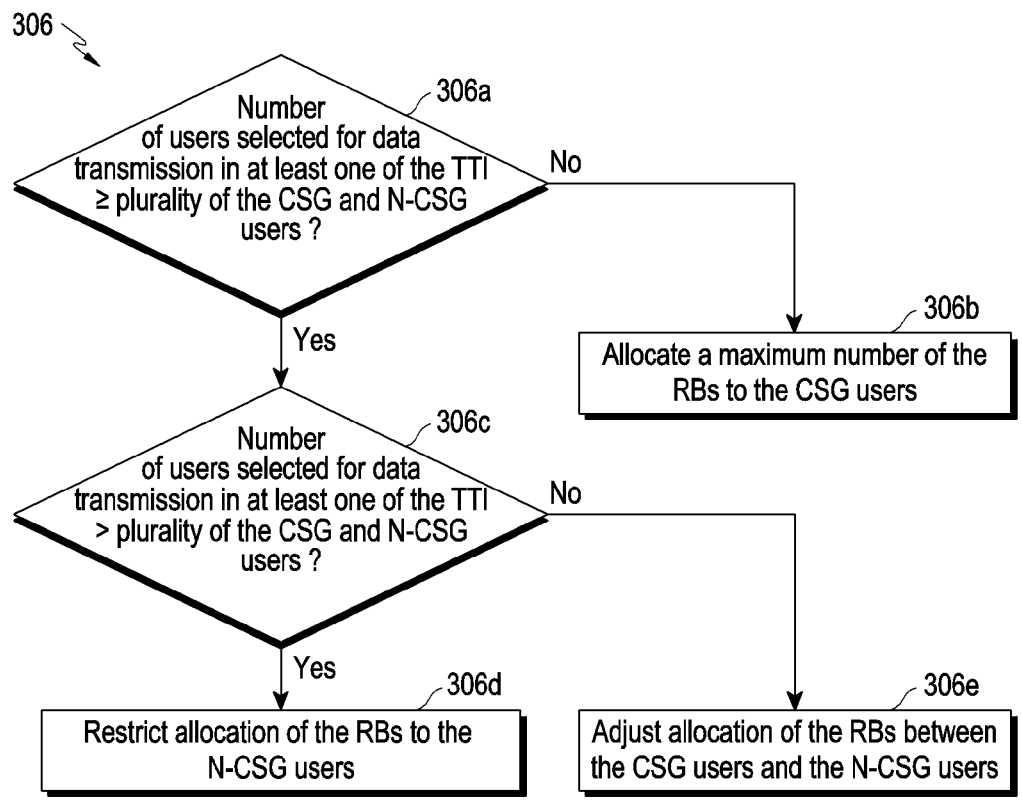

[Fig. 4]
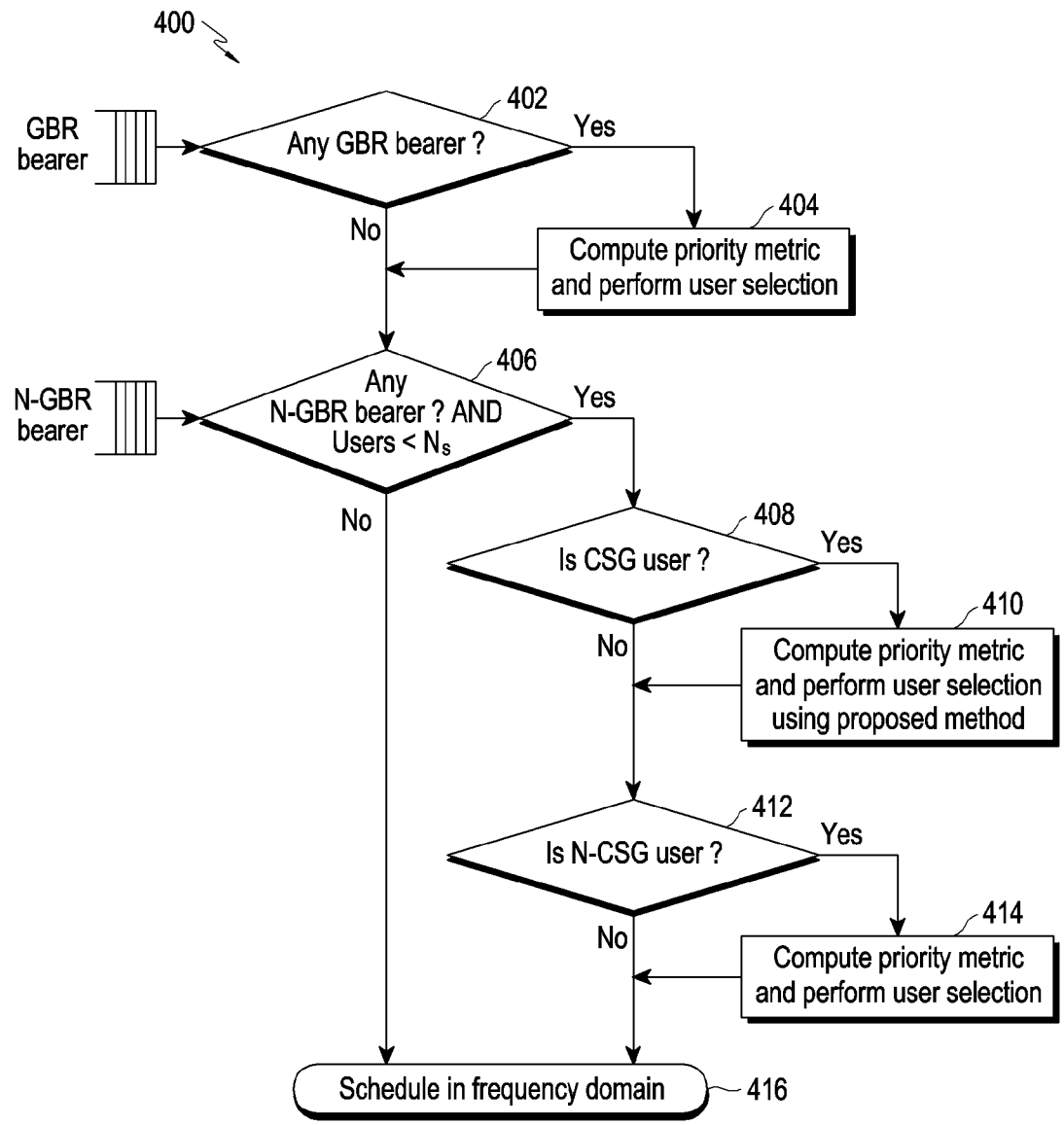

METHOD AND BASE STATION FOR CSG AWARE SCHEDULING IN WIRELESS NETWORK

PRIORITY

This application is a National Phase Entry of PCT International Application No. PCT/KR2019/009155, which was filed on Jul. 24, 2019 and claims priority to Indian Patent Application No. 201841027786 (CS), which was filed in the Indian Intellectual Property Office on Jul. 15, 2019, and Indian Patent Application No. 201841027786 (PS), which was filed in the Indian Intellectual Property Office on Jul. 24, 2018 the entire disclosure of each of which is incorporated herein by reference.

BACKGROUND

1. Field

This disclosure relates to cellular technologies, and more specifically to a method and base station for Closed Subscriber Group (CSG) aware scheduling in a wireless network.

2. Description of the Related Art

Long Term Evolution (LTE) wireless communication standards are implemented in cellular communication with an objective of providing high data rate transmission of an order of several hundreds of Megabits per second (Mbps) with low latency. The LTE implemented systems have a spectral efficiency in transmission in an order of several bits per second per hertz (bps/Hz) with an overall network latency of less than 1 millisecond (ms), where the LTE system supports backward compatibility. Therefore, cellular operators are motivated to deploy the LTE system for supporting variety of applications. Orthogonal Frequency Division Multiplexing (OFDM) is used in the LTE implemented system as a physical layer technology in which symbols are modulated for a Transmit Time Interval (TTI) of 1 ms.

Granularity of allocating resources to User Equipment (UEs) connected to a base station (i.e. eNodeB (eNB)) in the LTE implemented system is smaller as compared to that in $2^{nd}$ Generation (2G) cellular system and $3^{rd}$ Generation (3G) cellular system. Moreover, an existing scheduling mechanism of the LTE implemented system is two dimensional, where the resources have to be shared across the UEs in both time and frequency by the scheduling mechanism. However, designing a scheduling mechanism to operate for non-OFDM based transmission schemes of the LTE implemented system is more complex.

FIG. 1 illustrates an overview of Down-Link (DL) scheduling and resource allocation operation for data services in the LTE implemented system. The existing scheduling mechanism available for OFDM based transmission schemes in the LTE implemented system operates with a fairness among the UEs, cell throughput maximization, priority based resource allocation etc. The existing scheduling mechanism determines a priority metric for the UEs in each TTI based on parameters such as a reported Channel State Information (CSI) value in the Uplink (UL), an average throughput of UE, a Buffer Occupancy (BO), a type of bearer (e.g. Guaranteed Bit Error Rate (GBR) and Non-GBR (N-GBR)), a priority, etc. An upper layer in the LTE implemented system informs the type of bearer to the existing scheduling mechanism at a time of bearer creation. A physical layer in the LTE implemented system provides the CSI value to the existing scheduling mechanism based on a pre-defined periodicity. A Medium Access Control (MAC) layer in the LTE implemented system is responsible for computing priority among the UEs and performs the resource allocation based on the computed priority. The UEs that have higher priority metric value are selected for data transmission in a particular TTI. The existing scheduling mechanism determines an order of the resource allocation for the selected UEs based on the priority metric value of the UEs. A Transport Block (TB) size is computed for each UE based on the number of Resource Blocks (RBs) allocated and a Modulation and Coding Scheme (MCS) level, where the TB is further informed to Radio Link Control (RLC) layer. The RLC updates the remaining BO value as per the allocated TB size and directly transfer data to the physical layer.

A small cell is a miniature version of the base station in the LTE system, which are being deployed in public and private areas using the LTE system to provide uninterrupted connectivity to the UEs. In such deployment scenarios, a major requirement is to prioritize users in Closed Subscriber Group (CSG) for providing a better Quality of Service (QoS). Bearers (i.e. candidates) which are suitable for DL transmission is selected by the existing scheduling mechanism in the order of common services, GBR services, N-GBR services etc. The existing scheduling mechanism allocates the RB to selected UEs based on QoS requirements of the UEs. However, the CSG or Non-Closed Subscriber Group (N-CSG) users are not differentiated and prioritized within a GBR/N-GBR bearer group by the existing scheduling mechanism. Moreover, the CSG users have to be more prioritized over the N-CSG users within the GBR/N-GBR bearer group.

A cross-layer Radio Resource Management (RRM) framework is proposed in an existing solution. However, the cross-layer RRM framework operates based on a distributed power adaptation method, which is not suitable for real time scenarios. The resource allocates for prioritizing the CSG users based on a greedy approach is proposed in another existing solution. However, the existing solution does not use constraints such as a restricting number of scheduled UEs per TTI while allocating resources. Another existing solution is available for video packet prioritization. However, the existing solution is suboptimal when both the GBR and N-GBR traffics are scheduled in a single TTI.

Thus, it is desired to address the above mentioned shortcomings or at least provide a useful alternative.

SUMMARY

An embodiment of the disclosure provides a method and base station for CSG aware scheduling in a wireless network.

An embodiment of the present disclosure determines a priority metric for a plurality of CSG and N-CSG users in each TTI based on a plurality of parameters includes an MCS, a reported QCI for GBR and N-GBR bearers, an aggregate data rate of the CSG users, a Packet Delay (PD) of the GBR and N-GBR bearers, a BO, a type of bearer and a priority of the CSG users and the N-CSG users.

An embodiment of the disclosure modifies the priority metric using a configured weight index.

An embodiment of the disclosure controls selection of the CSG and N-CSG users in the TTI based on the modified priority metric.

An embodiment of the disclosure controls allocation of RBs to the CSG and N-CSG users based on the modified priority metric.

An embodiment of the disclosure provides a MAC scheduling method for prioritizing a throughput of the CSG users.

An embodiment of the disclosure restricts a data rate of the N-CSG users and an N-GBR traffic as per the configured weight index value in both DL and UL transmissions.

An embodiment of the disclosure implements a multi-UE scenario for selecting the CSG and N-CSG users in the TTI and allocating the RBs to the CSG and N-CSG users.

An embodiment of the disclosure prioritizes resource block allocation for the N-GBR bearers associated with the CSG users over the N-GBR bearers associated with the N-CSG users.

Accordingly the embodiments herein provide a method for CSG aware scheduling in a wireless network. The method includes determining, by a base station, a priority metric for a plurality of CSG and N-CSG users in each TTI based on a plurality of parameters. Further, the method includes modifying, by the base station, the priority metric using a configured weight index. Further, the method includes controlling, by the base station, selection of the CSG and N-CSG users in the TTI and allocation of RBs to the CSG and N-CSG users based on the modified priority metric.

In an embodiment, the plurality of parameters comprises an MCS, a reported QCI for GBR bearers and N-GBR bearers, an aggregate data rate of the CSG users, a PD of the GBR bearers and N-GBR bearers, a BO, a type of bearer and a priority of the CSG users and the N-CSG users.

In an embodiment, the MCS is related to a reported Channel Quality Indicator (CQI) and a Signal-to-Interference Noise Ratio (SINR).

In an embodiment, the QCI is a QoS priority associated with the GBR bearers and N-GBR bearers.

In an embodiment, the PD is a scheduling delay of a packet indicating a time interval between arrival of the packet to a scheduler and a scheduling time.

In an embodiment, the BO indicates an amount of data pending in a queue for the GBR bearers and N-GBR bearers for CSG and N-CSG User.

In an embodiment, the plurality of reported and measured parameters are dynamically varied based on at least one of a traffic load and a channel condition.

In an embodiment, the priority metric is modified by performing one of decrementing a priority of the N-CSG users and increasing a priority of the CSG users.

In an embodiment, controlling, by the base station, selection of the CSG and N-CSG users in the TTI and allocation of the RBs to the CSG and N-CSG users based on the modified priority metric, includes determining, by the base station, whether a number of users selected for data transmission in at least one of the TTI is greater than the plurality of the CSG and N-CSG users or less than the plurality of the CSG and N-CSG users or equal to the plurality of the CSG and N-CSG users and performing, by the base station, one of: allocating a maximum number of the RBs to the CSG users in response to determining that the number of users selected for the data transmission in at least one of the TTI is less than the plurality of the CSG and N-CSG users, restricting allocation of the RBs to the N-CSG users in response to determining that the number of users selected for the data transmission in at least one of the TTI is greater than the plurality of the CSG and N-CSG users, and adjusting allocation of the RBs between the CSG users and the N-CSG users in response to determining that the number of users selected for the data transmission in at least one of the TTI is equal to the plurality of the CSG and N-CSG users.

In an embodiment, the allocation of the RBs for the N-GBR bearers associated with the CSG users is prioritized over the N-GBR bearers associated with the N-CSG users.

Accordingly the embodiments herein provide a base station for CSG aware scheduling in a wireless network. The base station includes a processor configured to determine a priority for each of a plurality of CSG users and a plurality of non-closed subscriber group (N-CSG) users in a time domain based on a plurality of parameters; change the determined priority for each of the plurality of CSG users and the plurality of N-CSG users using a weight value; and allocate resource blocks (RBs) to each of the plurality of CSG users and the plurality of N-CSG users based on the changed priority for each of the plurality of CSG users and the plurality of N-CSG users.

Another embodiment of the present disclosure provides a method for CSG aware scheduling in a wireless network. The method includes determining, by a base station, a priority for each of a plurality of CSG users and a plurality of non-closed subscriber group (N-CSG) users in a time domain based on a plurality of parameters; changing, by the base station, the determined priority for each of the plurality of CSG users and the plurality of N-CSG users using a weight value; and allocating, by the base station, resource blocks (RBs) to each of the plurality of CSG users and the plurality of N-CSG users based on the changed priority for each of the plurality of CSG users and the plurality of N-CSG users.

Accordingly the embodiments herein provide a base station for CSG aware scheduling in a wireless network. The base station includes a memory and a processor, coupled to the memory. The processor is configured to determine a priority for each of CSG users and non-closed subscriber group (N-CSG) users in a time domain based on a plurality of parameters, and to change the priority for each of the CSG users and the N-CSG users using a weight value. The processor is configured to allocate resource blocks (RBs) to the CSG users and the N-CSG users based on the changed priority for each of the CSG users and the N-CSG users.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method and system is illustrated in the accompanying drawings, throughout which like reference letters indicate corresponding parts in the various figures. The embodiments herein will be better understood from the following description with reference to the drawings, in which:

FIG. 1 is an overview of a conventional DL scheduling and resource allocation operation for data services in the LTE system;

FIG. 2A illustrates components of a base station for CSG aware scheduling in a wireless network, according to an embodiment of the disclosure;

FIG. 2B illustrates components of a processor in the base station for controlling selection of CSG and N-CSG users in a TTI and allocation of RBs to the CSG and N-CSG users based on a modified priority metric, according to an embodiment of the disclosure;

FIG. 3A is a flow diagram illustrating a method for the CSG aware scheduling in the wireless network, according to an embodiment of the disclosure;

FIG. 3B is a flow diagram illustrating steps in controlling selection of the CSG and N-CSG users in the TTI and allocation of the RBs to the CSG and N-CSG users based on the modified priority metric, according to an embodiment of the disclosure; and FIG. 4 is a flow diagram illustrating steps in time domain scheduling for CSG user prioritization, according to an embodiment of the disclosure.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Multiple MAC Quality of service Class Identifiers (QCI) are considered in an LTE implemented system to ensure bearer traffic that have to allocate for the different Quality of Service (QoS) requirements. Nine different QCI values are available in 3$^{rd}$ Generation Partnership Project (3GPP) specifications and the respective priority, PD and target Packet Error Rate (PER) are also defined in the 3GPP specifications. The QCI values can be broadly classified under GBR and N-GBR categories. In GBR services, a base station must provide the configured aggregate data rate for end users whereas in case of N-GBR services it is optional.

Let $\varphi$ is a set of bearers associated with CSG or N-CSG users serving the GBR or N-GBR traffic in the base station. $\varphi$ is expressed mathematically in Equation (1).

$$\begin{aligned}\varphi &= \{\varphi^{CSG}, \varphi^{N-CSG}\} \\ &= \{\varphi_{GBR}^{CSG}, \varphi_{N-GBR}^{CSG}, \varphi_{GBR}^{N-CSG}, \varphi_{N-GBR}^{N-CSG}\}\end{aligned} \quad (1)$$

where $\varphi^{CSG}$ is a set of bearers associated with the CSG users, $\varphi^{N-CSG}$ is a set of bearers associated with N-CSG users. $\varphi_{GBR}^{CSG}$ is the set of GBR bearers associated with the CSG users and $\varphi_{N-GBR}^{CSG}$ is the set of N-GBR bearers associated with the CSG users. $\varphi_{GBR}^{N-CSG}$ is the set of GBR bearers associated with the N-CSG users and $\varphi_{N-GBR}^{N-CSG}$ is the set of N-GBR bearers associated with the N-CSG users.

As per the 3GPP specifications, more than one bearer is applicable for a UE. Hence, the bearers associated with a user k is given in Equation (2).

$$B^k = \bigcup_{i=0}^{N_b-1} b_k^i, \quad (2)'$$

$$i \in \{\varphi_{GBR}^{CSG}, \varphi_{N-GBR}^{CSG}\} \text{ or } \{\varphi_{GBR}^{N-CSG}, \varphi_{N-GBR}^{N-CSG}\};$$

$$k \in \varphi^{CSG} \text{ or } \varphi^{N-CSG},$$

where $N_b$ is the number of bearers that can be accommodated for each user. $b_k^i$ is $i^{th}$ bearer associated with the $k^{th}$ user, where b represents individual bearers.

Let $A^{GBR}$ and $A^{N-GBR}$ is an average bit rate requirement for the GBR and N-GBR services, respectively. Consider maintaining the value of $A^{GBR}$ and $A^{N-GBR}$ as being the same for the all the users. A MAC scheduler performs resource allocation in the order of $\varphi_{GBR}^{CSG}$, $\varphi_{GBR}^{N-CSG}$, $\varphi_{N-GBR}^{CSG}$, $\varphi_{N-GBR}^{N-CSG}$. As per the order, the GBR bearer of N-CSG user is given high priority than the N-GBR bearer of the CSG user.

Scheduling operation is a twofold process in the LTE implemented system which includes a selection of users in a TTI (i.e. scheduling in Time Domain (TD)) and resource allocation for the selected users (i.e. scheduling in Frequency Domain (FD)).

In case of scheduling in FD, the MAC scheduler is assigned to select suitable RBs to the UEs based on reported channel conditions in order to maximize a cell throughput, which is mathematically defined in Equation (3).

$$\begin{aligned}&\underset{\forall k}{\text{Max}} \left(\mathcal{R}^k(t)\right), k \le N_s \\ &\underset{\forall k}{\text{Max}} \left(\sum_{l=0}^{N_{RB}-1} a_l^k(t) R_l^k(t) R_l^k(t)\right); a_l^k(t) \in \{0, 1\},\end{aligned} \quad (3)$$

where $\mathcal{R}^k(t)$ is the allocated data rate for the $k^{th}$ user at a time instant t. $N_{RB}$ is the number of available RBs for system bandwidth. $a_l^k(t)$ is the assignment indicator for $l^{th}$ RB assigned to the $k^{th}$ user at the time instant t. $a_l^k(t)=1$ when the RB is allocated to a respective user, otherwise $a_l^k(t)=0$. The achievable data rate $R_l^k(t)$ is defined based on a capacity equation as $R_l^k(t)=N_{SC}^{RB} \cdot \Delta f \cdot \log_2(1+SINR_l^k(t))$. $N_{SC}^{RB}$ is a number of subcarriers per RB. $\Delta f$ is a subcarrier spacing. $SINR_l^k(t)$ is a SINR for the $l^{th}$ RB with respect to the $k^{th}$ user. The SINR is predicted based on the reported CSI value.

As per the Equation (2), $\mathcal{R}^k(t)$ splits across bearers associated with the user k, which is mathematically defined in Equation (4).

$$\mathcal{R}^k(t) = \Sigma_{i=0}^{N_b-1} \gamma_i r_i^k(t) : \Sigma_{\forall i} \gamma_i \leq 1 \qquad (4)$$

where, $r_i^k(t)$ is the data rate associated with the bearer i. The value of $\gamma_i$ depends on the data rate distribution across the bearers based on priority levels. In an example, if a particular data rate is allocated for the user, then the value of $\gamma_i$ provides the data rate distribution among the bearers within the user.

The distribution of the RBs for the users is based on the BO requirement and reported CQI, which is mathematically defined in Equation (5).

$$N_{RB} = \Sigma_{k=0}^{N_s-1} N_{RB}^k = \Sigma_{k=0}^{N_s-1} (N_{RB}^{k,GBR} + N_{RB}^{k,N-GBR})$$

$$N_{RB}^{k,GBR} \leq N_{RB,GBR}^{Max}$$

$$N_{RB}^{k,N-GBR} \leq N_{RB,N-GBR,CSG}^{Max} \text{ or } N_{RB,N-GBR,N-CSG}^{Max} \qquad (5)$$

where $N_{RB}^k$ is the number of RBs allocated to the user k. $N_{RB}^{k,GBR}$ is the number of RBs allocated for the GBR bearer for the user k. $N_{RB,GBR}^{Max}$ is the maximum RB allocation for the GBR bearer. $N_{RB,N-GBR,CSG}^{Max}$ is the maximum RB allocation for the N-GBR bearer of the CSG user to prevent starvation.

In case of scheduling in TD, $N_s$ users are selected for data transmission in the TTI from N connected users ($N_s \ll N$). Hence, the priority metric for the users should be determined to meet the respective aggregate data rates with a constraint of only $N_s$ users per TTI. The value of $N_s$ depends on the implementation complexity of the MAC scheduler. The packet delay of the GBR and N-GBR bearers based on the instantaneous allocated data rate is defined in Equation (6).

$$W_{k,i}^{GBR} = \frac{A^{GBR}}{y_i r_i^k(l)};$$

$$W_{k,i}^{N-GBR} = \frac{A^{N-GBR}}{y_i r_i^k(t)} \qquad (6)$$

A problem of user selection meeting the above requirements is defined in Equation (7), with respect to delay in scheduling.

$$Pr(W_{k,i}^{GBR} > T^{GBR}) = 0;$$

$$Pr(W_k^{N-GBR} > T^{N-GBR}) = \delta \qquad (7)$$

$T^{GBR}$ and $T^{N-GBR}$ are the maximum delay budget for the GBR and N-GBR services defined in 3GPP specifications. $\delta$ is the maximum probability exceeding threshold for the N-GBR services. The value of $\delta$ is separately maintained for CSG and N-CSG users and the relation is configured from the upper layers.

$$CSG_{WI} = \frac{\delta^{N-CSG}}{\delta^{CSG}}; \delta^{N-CSG} > \delta^{CSG} \qquad (8)$$

Equation (8) indicates that aggregate data rate of CSG user should be maintained $CSG_{WI}$ times of N-CSG user for prioritization. The scheduled bearer subset ($N_s$) consists of one of the three different users combinations as given in Equation (9).

$$\varphi(N_s) \in \{\varphi^{CSG}, \varphi^{N-CSG}\} \text{ or } \varphi^{CSG} \text{ or } \varphi^{N-CSG} \qquad (9)$$

Accordingly the embodiments herein provide a method for CSG aware scheduling in a wireless network. The method includes determining, by the base station, a priority metric for a plurality of CSG and N-CSG users in each TTI based on a plurality of parameters. Further, the method includes modifying, by the base station, the priority metric using a configured weight index. Further, the method includes controlling, by the base station, selection of the CSG and N-CSG users in the TTI and allocation of RBs to the CSG and N-CSG users based on the modified priority metric.

A MAC scheduling method is provided for prioritizing the throughput of the CSG users in the disclosure. Unlike existing methods and systems, the disclosed method can be used to dynamically adjust the throughput of users as per user configurations.

The disclosed method can be used for resource allocation by prioritizing a CSG user's traffic. A data rate of N-CSG users and an N-GBR traffic is restricted as per configured CSG index value (i.e. configured weight index) in both DL and UL transmissions. However, a GBR traffic of the CSG and N-CSG users are not disturbed. Further, the method can be extended for supporting several numbers of UEs per TTI in both the DL and UL transmissions. An additional overhead for implementing the disclosed method is less as compared to processing power of LTE eNBs.

Referring now to the drawings and more particularly to FIGS. 2A through 4, there are shown preferred embodiments.

FIG. 2A is a block diagram illustrating components of a base station 100 for CSG aware scheduling in a wireless network, according to an embodiment as disclosed herein. A mobile communication network is an example for the wireless network. In an embodiment, the base station 100 includes a processor 110, a memory 120 and a communicator 130. The processor 110 is configured to determine a priority metric for a plurality of CSG and N-CSG users in each TTI based on a plurality of parameters. In an embodiment, the plurality of parameters includes an MCS, a reported QCI for GBR and N-GBR bearers, an aggregate data rate of the CSG users, a PD of the GBR and N-GBR bearers, a BO, a type of bearer and a priority of the CSG users and the N-CSG users.

In an embodiment, the MCS is related to a reported CQI and a SINR. In an embodiment, the QCI is a QoS priority associated with the GBR and N-GBR bearers. In an embodiment, the PD is a scheduling delay of a packet indicating a time interval between arrival of the packet to a scheduler (labeled as weighted fairness scheduler 112 in FIG. 2B) and a scheduling time. In an embodiment, the BO indicates an amount of data pending in a queue for the GBR and N-GBR bearers for CSG and N-CSG User. In an embodiment, the plurality of reported and measured parameters are dynamically varied based on at least one of a traffic load and a channel condition.

The processor 110 is configured to modify the priority metric using a configured weight index. In an embodiment, the priority metric is modified by decrementing a priority of the N-CSG users or increasing a priority of the CSG users.

The processor 110 is configured to control selection of the CSG and N-CSG users in the TTI and allocation of RBs to the CSG and N-CSG users based on the modified priority metric. In an embodiment, the processor 110 is configured to determine whether a number of users selected for data transmission in at least one of the TTI is greater than the plurality of the CSG and N-CSG users or less than the plurality of the CSG and N-CSG users or equal to the plurality of the CSG and N-CSG users. Further, the processor 110 is configured to allocate a maximum number of the RBs to the CSG users in response to determining that the number of users selected for the data transmission in at least one of the TTI is less than the plurality of the CSG and N-CSG users. The processor 110 is configured to restrict allocation of the RBs to the N-CSG users in response to determining that the number of users selected for the data transmission in at least one of the TTI is greater than the plurality of the CSG and N-CSG users. The processor 110 is configured to adjust allocation of the RBs between the CSG users and the N-CSG users in response to determining that the number of users selected for the data transmission in at least one of the TTI is equal to the plurality of the CSG and N-CSG users.

In another embodiment, a selection of $N_s$ users in TD scheduling for bearers is based on the priority metric value computed in each TTI by considering the real time reported and measured plurality of parameters. In an embodiment, the processor 110 is configured to determine the priority metric based on Equation (10).

$$PM_i^k(t) = f(MCS_i^k(t), PD_i^k(t), BO_i^k(t), CQI_i^k(C), QCI_i) \quad (10)$$

In Equation (10), $QCI_i$ is a QoS priority associated with the bearer i. PD is a scheduling delay of the packet which is a time interval between arrival of a packet to the scheduler and scheduling time. BO reported from RLC layer indicates an amount of data pending in a queue for a particular bearer. Intuitively, the metric PD provides the fairness among the UEs since the value of PD will increase if the packet is not scheduled for long time. The metric PD is widely used in modern LTE schedulers. The parameters $QCI_i$, PD and BO dynamically vary based on the traffic load, channel conditions etc. Hence, the parameters $QCI_i$, PD and BO in each TTI are determined for priority metric computation. $MCS_i^k$ is an instantaneous MCS index for $k^{th}$ user at a time $t^{th}$.

By considering the problem defined in the Equation (6), an existing scheduling logic has been modified for CSG user prioritization only for the N-GBR bearer. The priority metric of GBR services of the N-CSG user is not altered. The modified priority metric value as per the disclosed method to prioritize the CSG users is mathematically expressed in Equation (11).

$$PM_i^{k,CSG}(t) = f(MCS_i^k(t), PDB_i^k(t), BO_i^k(t), CQI^k(t), QCI_i) + CSG\_WEIGHT \quad (11)$$

In an embodiment, an additional weight value is added for the CSG users prioritization based on the configured weight index given in the Equation (7). For example, $CSG_{W1}=4$ corresponds to 80% of bandwidth allocation for the CSG users and 20% for the N-CSG users. So CSG_WEIGHT value is added such that CSG users are selected for scheduling 80% of time. The remaining 20% of time, the N-CSG users are selected due to increase in PD metric. As per the Equation (9) equal weight is added for all the CSG users and the priority metric value of the N-CSG users is not modified. In such a way, the fairness among the CSG UEs and the N-CSG UEs are maintained. This modification can be effectively seen as maintaining a ratio of the priority metric value for the CSG and N-CSG users. Hence, the CSG user prioritization is alternatively calculated using Equation (12).

$$PM_i^{k,N-CSG}(t) = f(MCS_i^k(t), PDB_i^k(t), BO_i^k(t), CQI^k(t), QCI_i) - CSG\_WEIGHT \quad (12)$$

The CSG user prioritization through the TD scheduling works perfectly when $N_s<N$. But in case of $N_s \geq N$, RB allocation must be restricted for N-CSG users as per $CSG_{W1}$ value. Consider a scenario of $N_s=N$ and $\varphi(N_s) \in \{\varphi^{CSG}, \varphi^{N-CSG}\}$, it is possible that all the UEs considered for scheduling in every TTI, hence there is no impact of the TD scheduling for the CSG user prioritization. So it is required to limit the number of RB of the N-CSG users as per $CSG_{W1}$. In an embodiment, the disclosed method is used to schedule in FD for the CSG user prioritization, where $N_s=N=2$ and $CSG_{W1}=4$. The method includes assigning the RBs to the GBR bearer, which subject to maximum per UE limit of $N_{RB,GBR}^{Max}$ to avoid starvation. Further, the method includes updating the N-CSG user N-GBR bearer maximum RB limit $N_{RB,N-GBR,N-CSG}^{Max}$ to 20% of remaining RBs (intended for N-GBR bearers) if both CSG and N-CSG users are present in selected $N_s$ users list. Further, the method includes updating the CSG user N-GBR bearer maximum RB limit $N_{RB,N-GBR,CSG}^{Max}$ to 50% of remaining RBs user if only the CSG users present in selected $N_s$ users list. Further, the method includes performing the above steps for N-CSG users. Further, the method includes assigning RBs for N-GBR bearers as per an updated maximum RB limit. $N_{RB,N-GBR,CSG}^{Max}$ is adjusted based on the users combination in subset $\varphi(N_s)$ as defined in the Equation (9). The RBs are assigned to the $N_s$ selected users based on their priority levels.

In an embodiment, the allocation of the RBs for N-GBR bearers associated with the CSG users is prioritized over N-GBR bearers associated with the N-CSG users. In an example scenario, the N-GBR bearers associated with the CSG users are prioritized over the N-GBR bearers associated with the N-CSG users in a ratio of 80:20 (i.e. 80 for the N-GBR CSG users and 20 for the N-GBR N-CSG users) or 75:25 or 67:33 or 50:50 percentage, based on the requirement.

In an embodiment, during multi-UE scenario, a cell throughput divides across the UEs based on the combinations of the CSG and N-CSG users with respect to the configured weight index.

In an embodiment, the cell throughput per UE splits across the bearers based on the value of γ. Further, the cell throughput per UE splits for an unequal number of the CSG and N-CSG users.

The processor 110 is configured to execute instructions stored in the memory 120. The memory 120 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory 120. In certain examples, a non-transitory storage medium may store the data that can, over time, change (e.g., in Random Access Memory (RAM) or cache).

The communicator 130 is configured to communicate internally between hardware components in the base station 100. Further, the communicator 130 is configured to enable communication between the base station 100 the UEs and other network nodes in the wireless network.

Although FIG. 2A shows the hardware components of the base station 100 but it is to be understood that other embodiments are not limited thereon. In other embodiments, the base station 100 may include fewer or more of components. Further, the labels or names of the components are used only for illustrative purpose and does not limit the scope of the invention. One or more components can be combined together to perform same or substantially similar function for the CSG aware scheduling.

FIG. 2B is a block diagram illustrating components of the processor 110 in the base station 100 for controlling selection of the CSG and N-CSG users in the TTI and allocation of the RBs to the CSG and N-CSG users based on the modified priority metric, according to an embodiment as disclosed herein. In an embodiment, the processor 110 includes the weighted fairness scheduler 112, a priority metric modifier 114, a user selector 116 and a resource block allocator 118.

The weighted fairness scheduler 112 determines the priority metric for the plurality of CSG and N-CSG users in each TTI based on the plurality of parameters. In an embodiment, the weighted fairness scheduler 112 determines the plurality of parameters for determining the priority metric. The priority metric modifier 114 modifies the priority metric using the configured weight index.

The user selector 116 controls selection of the CSG and N-CSG users in the TTI based on the modified priority metric. The resource block allocator 118 controls allocation of RBs to the CSG and N-CSG users based on the modified priority metric.

In another embodiment, the user selector 116 determines whether the number of users selected for the data transmission in at least one of the TTI is greater than the plurality of the CSG and N-CSG users or less than the plurality of the CSG and N-CSG users or equal to the plurality of the CSG and N-CSG users. Further, the resource block allocator 118 allocates the maximum number of the RBs to the CSG users in response to determining that the number of users selected for the data transmission in at least one of the TTI is less than the plurality of the CSG and N-CSG users. The resource block allocator 118 restricts allocation of the RBs to the N-CSG users in response to determining that the number of users selected for the data transmission in at least one of the TTI is greater than the plurality of the CSG and N-CSG users. The resource block allocator 118 adjusts allocation of the RBs between the CSG users and the N-CSG users in response to determining that the number of users selected for the data transmission in at least one of the TTI is equal to the plurality of the CSG and N-CSG users.

Although FIG. 2B shows the hardware components of the processor 110, it is to be understood that other embodiments are not limited thereon. In other embodiments, the processor 110 may include fewer or more components. Further, the labels or names of the components are used only for illustrative purpose and does not limit the scope of the invention. One or more components can be combined together to perform same or substantially similar function for controlling selection of the CSG and N-CSG users in the TTI and allocation of the RBs to the CSG and N-CSG users based on the modified priority metric.

FIG. 3A is a flow diagram 300 illustrating a method for CSG aware scheduling in the wireless network, according to an embodiment of the present disclosure. At step 302, the method includes determining the priority metric for the plurality of the CSG and N-CSG users in each TTI based on the plurality of parameters. In an embodiment, the method allows the weighted fairness scheduler 112 to determine the priority metric for the plurality of the CSG and N-CSG users in each TTI based on the plurality of parameters. At step 304, the method includes modifying the priority metric using the configured weight index. In an embodiment, the method allows the priority metric modifier 114 to modify the priority metric using the configured weight index. At step 306, the method includes controlling selection of the CSG and N-CSG users in the TTI and allocation of the RBs to the CSG and N-CSG users based on the modified priority metric. In an embodiment, the method allows the user selector 116 to control selection of the CSG and N-CSG users in the TTI based on the modified priority metric. In an embodiment, the method allows the resource block allocator 118 to control allocation of the RBs to the CSG and N-CSG users based on the modified priority metric.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

FIG. 3B is a flow diagram illustrating details of step 306 of FIG. 3A, in controlling selection of the CSG and N-CSG users in the TTI and allocation of the RBs to the CSG and N-CSG users based on the modified priority metric, according to an embodiment as disclosed herein. At step 306a, a determination is made of whether the number of users selected for the data transmission in at least one of the TTI is greater than or equal to the plurality of the CSG and N-CSG users. In an embodiment, the method allows the user selector 116 to determine whether the number of users selected for the data transmission in at least one of the TTI is greater than or equal to the plurality of the CSG and N-CSG users. At step 306b, the method includes allocating the maximum number of the RBs to the CSG users in response to determining that the number of users selected for the data transmission in at least one of the TTI is less than the plurality of the CSG and N-CSG users. In an embodiment, the method allows the resource block allocator 118 to allocate the maximum number of the RBs to the CSG users in response to determining that the number of users selected for the data transmission in at least one of the TTI is less than the plurality of the CSG and N-CSG users.

At step 306c, a determination is made of whether the number of users selected for the data transmission in at least one of the TTI is greater than the plurality of the CSG and N-CSG users in response to determining that the number of users selected for the data transmission in at least one of the TTI is greater than or equal to the plurality of the CSG and N-CSG users. In an embodiment, the method allows the user selector 116 to determine whether the number of users selected for the data transmission in at least one of the TTI is greater than the plurality of the CSG and N-CSG users in response to determining that the number of users selected for the data transmission in at least one of the TTI is greater than or equal to the plurality of the CSG and N-CSG users.

At step 306d, allocation of the RBs to the N-CSG users is restricted in response to determining that the number of users selected for the data transmission in at least one of the TTI is greater than the plurality of the CSG and N-CSG users. In an embodiment, the method allows the resource block allocator 118 to restrict allocation of the RBs to the N-CSG users in response to determining that the number of users selected for the data transmission in at least one of the TTI is greater than the plurality of the CSG and N-CSG users. At step 306e, an allocation of the RBs between the CSG users and the N-CSG users is adjusted in response to determining that the number of users selected for the data transmission in at least one of the TTI is equal to the plurality of the CSG and N-CSG users. In an embodiment, the method allows the resource block allocator 118 to adjust allocation of the RBs between the CSG users and the N-CSG users in response to determining that the number of users selected for the data transmission in at least one of the TTI is equal to the plurality of the CSG and N-CSG users.

The various actions, acts, blocks, steps, or the like in FIG. 3B may be performed in the order presented, in a different order or simultaneously. Further, in some embodiments, some of the actions, acts, blocks, steps, or the like may be omitted, added, modified, skipped, or the like without departing from the scope of the invention.

FIG. 4 is a flow diagram 400 illustrating steps in the time domain scheduling for the CSG user prioritization by the base station 100, according to an embodiment of the present disclosure. At step 402, the base station 100 determines whether the GBR bearer is available for the data transmission. If the GBR bearer is available for transmitting the data, at step 404 a priority metric is computed and user selection is performed. If the GBR bearer is not available at step 406, the base station 100 determines whether the N-GBR bearer is available for the data transmission and the number of users are less than Ns. If N-GBR bearer is available for transmitting the data and the number of users are less than Ns, at step 408 the base station 100 determines whether the CSG user is available to receive the data. If the N-GBR bearer is unavailable for transmitting the data or the number of users are not less than Ns, at step 416 the base station 100 initiates frequency domain scheduling. If in step 408 the CSG user is available to receive the data, at step 410 the base station 100 computes the priority metric and performs the user selection based on the disclosed method. Then, at step 412, the base station 100 determines whether the N-CSG user is available to receive the data. If the N-CSG user is available to receive the data, at step 414, the base station 100 computes the priority metric and performs the user selection. If the N-CSG user is not available to receive the data, at step 416 scheduling is performed in frequency domain.

The disclosed method for the CSG user prioritization can be implemented for both DL and UL MAC scheduling using QXDM analyzer for throughput validation. In an example, vital system parameters selected for the validation are given in Table 1.

TABLE 1

| | |
|---|---|
| Standard | LTE, R8 |
| Bandwidth | 10 MHz, 1024 Subcarriers |
| No. of Antennas | 2 × 2 |
| Channel | AWGN |
| Transmission mode | FDD |
| $N_{RB}$ | 50 |
| Modulation | 64 QAM |
| $CSG_{WI}$ | 1, 2, 3, 4 |
| CSG Vs N-CSG TP ratio | 50:50, 67:33, 75:25, 80:20 |
| $N_S$ | 2 |
| $N_{RB,GBR}^{Max}$ | 25 |
| Peak Cell TP: DL/UL | 70~72 Mbps/22~23 Mbps |

In the example, a total peak cell throughput of around 70 Mbps is obtained in DL scheduling and 23 Mbps is obtained in in UL scheduling by using the vital system parameters mentioned in the Table 1. Further, the cell throughput is divided across the UEs based on the combinations of CSG and N-CSG users with respect to configured weight index in case of the multi-UE scenario.

A throughput (TP) distribution of 1 CSG user and 1 N-CSG user scenario ($N_s$=N=2) with one N-GBR bearer each is given in Table 2. The disclosed method works in real time and a TP distribution percentage is almost matches with expected values in both DL and UL for the different CSG weight index values. In the example scenario, the CSG weight index=1, DL throughput is exactly split for CSG and N-CSG users of 35-37 Mbps each. In another example scenario, CSG weight index=4, 80% of DL throughput (56 Mbps) is given to CSG user and 20% of TP is given to N-CSG users. Based on the value of $\gamma_i$, TP per UE further splits across the bearers, which is applicable for CSG weight index 2 and 3. By considering the overall UL cell TP of 23 Mbps and CSG weight index value of 4, 18 Mbps is given to CSG UE and 4 Mbps is allocated to N-CSG UEs.

Table 2 is an example of throughput distribution for $N_s$=N=2.

TABLE 2

| CSG Cell | CSG UE | | | | N-CSG UE | | | |
|---|---|---|---|---|---|---|---|---|
| Weight Index | DL TP (Mbps) | DL TP Percentage | UL TP (Mbps) | UL TP Percentage | DL TP (Mbps) | DL TP Percentage | UL TP (Mbps) | UL TP Percentage |
| 1 | 35~37 | 50% | 11.6 | 48.30% | 35~37 | 50% | 11.3 | 45.20% |
| 2 | 47~49 | 66.60% | 15.5~15.8 | 66.6% | 23~24 | 31.90% | 7.3~7.7 | 33% |
| 3 | 53~54 | 75% | 16.5~17.5 | 75% | 17~19 | 25% | 5.5~5.7 | 25% |
| 4 | 56~57 | 78% | 18~18.5 | 79% | 14~15 | 20.80% | 4.2~4.5 | 19.20% |

The TP distribution of 2 CSG users and 1 N-CSG user scenario ($N_s=2$, N=3) with only N-GBR bearer each is given in Table 3. A sum of CSG user's throughput for CSG weight index 4 is around 80% of cell throughput (56 Mbps) and rest is achieved for one N-CSG user. The sum CSG user's throughput is further divided equally for two users. In the example scenario, in case of CSG weight index 4, CSG UE 1 and CSG, the UE 2 gets DL TP of 30 Mbps each whereas N-CSG UE gets DL TP of 11 Mbps. Therefore, the proposed method works for different CSG and N-CSG user combinations and the multi-UE scenario.

Table 3 is an example of throughput distribution for $N_s=2$ and N=3.

TABLE 3

| CSG Cell Weight | CSG UE 1 | | | | CSG UE 2 | | | | CSG UE 3 | | | |
|---|---|---|---|---|---|---|---|---|---|---|---|---|
| | DL TP (Mbps) | DL TP Percent | UL TP (Mbps) | UL TP Percent | DL TP (Mbps) | DL TP Percent | UL TP (Mbps) | UL TP Percent | DL TP (Mbps) | DL TP Percent | UL TP Mbps) | UL TP Percent |
| 1 | 23~24 | 33.30% | 7.5 | 33% | 23.2~24 | 33.30% | 7.5 | 33% | 24 | 33.30% | 7.5 | 33.00% |
| 2 | 24.5~25.5 | 35.20% | 8 | 35% | 24.3~25.1 | 35.20% | 8 | 35% | 25 | 30.00% | 7 | 31% |
| 3 | 27~27.5 | 38.70% | 8.5~8.7 | 37% | 26.5~27.5 | 38.00% | 8.5~8.7 | 37% | 16 | 22.50% | 5~5.5 | 26% |
| 4 | 30~30.5 | 40.50% | 8.9~9.1 | 40% | 30~30.5 | 40.70% | 8.9~9.1 | 40% | 10.5 | 18.00% | 3.5 | 20.00% |

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for closed subscriber group (CSG) aware scheduling in a wireless network, the method comprising:
    determining, by a base station, a priority for each of a plurality of CSG users and a plurality of non-closed subscriber group (N-CSG) users in a time domain based on a plurality of parameters;
    changing, by the base station, the determined priority for each of the plurality of CSG users and the plurality of N-CSG users using a weight value;
    allocating, by the base station, resource blocks (RBs) to each of the plurality of CSG users and the plurality of N-CSG users based on the changed priority for each of the plurality of CSG users and the plurality of N-CSG users, wherein the allocating comprises: identifying, by the base station, a number of users determined for data transmission in the time domain, and comparing the number of users determined for the data transmission and a number of the plurality of CSG users and the plurality of N-CSG users;
    allocating a maximum number of the RBs to the plurality of CSG users in case that the number of users determined for the data transmission is less than the number of the plurality of CSG users and the plurality of N-CSG users;
    allocating the RBs to the plurality of CSG users and restricting allocation of the RBs to the plurality of N-CSG users in case that the number of users determined for the data transmission is greater than the number of the plurality of CSG users and the plurality of N-CSG users; and
    adjusting an allocation of the RBs between the plurality of CSG users and the plurality of N-CSG users in case that the number of users determined for the data transmission is equal to the plurality of CSG users and the plurality of N-CSG users.

2. The method of claim 1, wherein the plurality of parameters comprises at least two of a modulation and coding scheme (MCS), a reported quality of service class indicator (QCI) for guaranteed bit rate (GBR) bearers and non-guaranteed bit rate (N-GBR) bearers, an aggregate data rate of each of the plurality of CSG users, a packet delay (PD) of the GBR bearers and the N-GBR bearers, a buffer occupancy (BO), and a type of bearer.

3. The method of claim 2, wherein the MCS is related to a reported channel quality indicator (CQI) and a signal-to-interference noise ratio (SINR).

4. The method of claim 2, wherein the QCI is a quality of service (QoS) priority associated with the GBR bearers and the N-GBR bearers.

5. The method of claim 2, wherein the PD is a scheduling delay of a packet indicating a time interval between arrival of the packet to a scheduler of the base station and a scheduling time.

6. The method of claim 2, wherein the BO indicates an amount of data pending in a queue for the GBR bearers and the N-GBR bearers for each of the plurality of CSG users and the plurality of N-CSG users.

7. The method of claim 1, wherein the plurality of parameters are changed based on at least one of a traffic load and a channel condition.

8. The method of claim 1, wherein the weight value is a value for at least one of decrementing a priority of each of the plurality of N-CSG users or increasing a priority of each of the plurality of CSG users.

9. The method of claim 1, wherein allocation of RBs for non-guaranteed bit rate (N-GBR) bearers associated with the plurality of CSG users is prioritized over allocation of RBs for N-GBR bearers associated with the plurality of N-CSG users.

10. A base station for closed subscriber group (CSG) aware scheduling in a wireless network, the base station comprising:

a processor, configured to:
determine a priority for each of a plurality of CSG users and a plurality of non-closed subscriber group (N-CSG) users in a time domain based on a plurality of parameters;
change the determined priority for each of the plurality of CSG users and the plurality of N-CSG users using a weight value;
allocate resource blocks (RBs) to each of the plurality of CSG users and the plurality of N-CSG users based on the changed priority for each of the plurality of CSG users and the plurality of N-CSG users, wherein the processor is further configured to: identify a number of users determined for data transmission in the time domain, and compare the number of users determined for the data transmission and a number of the plurality of CSG users and the plurality of N-CSG users;
allocate a maximum number of the RBs to the plurality of CSG users in case that the number of users determined for the data transmission is less than the number of the plurality of CSG users and the plurality of N-CSG users;
allocate the RBs to the plurality of CSG users and restricting allocation of the RBs to the plurality of N-CSG users in case that the number of users determined for the data transmission is greater than the number of the plurality of CSG users and the plurality of N-CSG users; and
adjust an allocation of the RBs between the plurality of CSG users and the plurality of N-CSG users in case that the number of users determined for the data transmission is equal to the plurality of CSG users and the plurality of N-CSG users.

11. The base station of claim 10, wherein the plurality of parameters comprises at least two of a modulation and coding scheme (MCS), a reported quality of service class indicator (QCI) for guaranteed bit rate (GBR) bearers and non-guaranteed bit rate (N-GBR) bearers, an aggregate data rate of each of the plurality of CSG users, a packet delay (PD) of the GBR bearers and the N-GBR bearers, a buffer occupancy (BO), and a type of bearer.

12. The base station of claim 11, wherein the MCS is related to a reported channel quality indicator (CQI) and a signal-to-interference noise ratio (SINR).

13. The base station of claim 11, wherein the QCI is a quality of service (QoS) priority associated with the GBR bearers and the N-GBR bearers.

14. The base station of claim 11, wherein the PD is a scheduling delay of a packet indicating a time interval between arrival of the packet to a scheduler of the base station and a scheduling time.

15. The base station of claim 11, wherein the BO indicates an amount of data pending in a queue for the GBR bearers and the N-GBR bearers for each of the plurality of CSG users and the plurality of N-CSG users.

16. The base station of claim 10, wherein the plurality of parameters are changed based on at least one of a traffic load and a channel condition.

17. The base station of claim 10, wherein the weight value is a value for at least one of decrementing a priority of each of the plurality of N-CSG users or increasing a priority of each of the plurality of CSG users.

18. The base station of claim 10, wherein allocation of RBs for non-guaranteed bit rate (N-GBR) bearers associated with the plurality of CSG users is prioritized over allocation of RBs for N-GBR bearers associated with the plurality of N-CSG users.

* * * * *